United States Patent [19]
Fielding et al.

[11] Patent Number: 5,887,513
[45] Date of Patent: Mar. 30, 1999

[54] MULTIPLE KABOB HOLDER

[76] Inventors: Douglas R. Fielding, 2149 Stuart St.; Charles S. Adams, 2816 Fulton St., both of Berkeley, Calif. 94705

[21] Appl. No.: 130,633

[22] Filed: Aug. 6, 1998

[51] Int. Cl.[6] ..................................... A47J 37/04
[52] U.S. Cl. ..................... 99/421 A; 99/421 H; 99/419
[58] Field of Search ................... 99/419, 421 A, 99/421 H, 426

[56] References Cited

U.S. PATENT DOCUMENTS 1,377,043  5/1921  Wilson ................................. 99/421 A
2,317,388  4/1943  Lako, Jr. ............................... 99/421 A
2,608,928  9/1952  McDonnell ........................... 99/421 A
4,583,263  4/1986  Wigley, Jr. .

*Primary Examiner*—Reginald L. Alexander
*Attorney, Agent, or Firm*—Owen, Wickersham & Erickson, P.C.

[57] ABSTRACT

A device for holding a plurality of skewered kabobs on a barbecue grill is disclosed. The device comprises a bottom section having side members for retaining the ends of transverse skewers and a cover section which holds the skewers in place during the cooking process. Both bottom and cover sections have supporting leg members so that the device can be turned over during the cooking process.

5 Claims, 4 Drawing Sheets

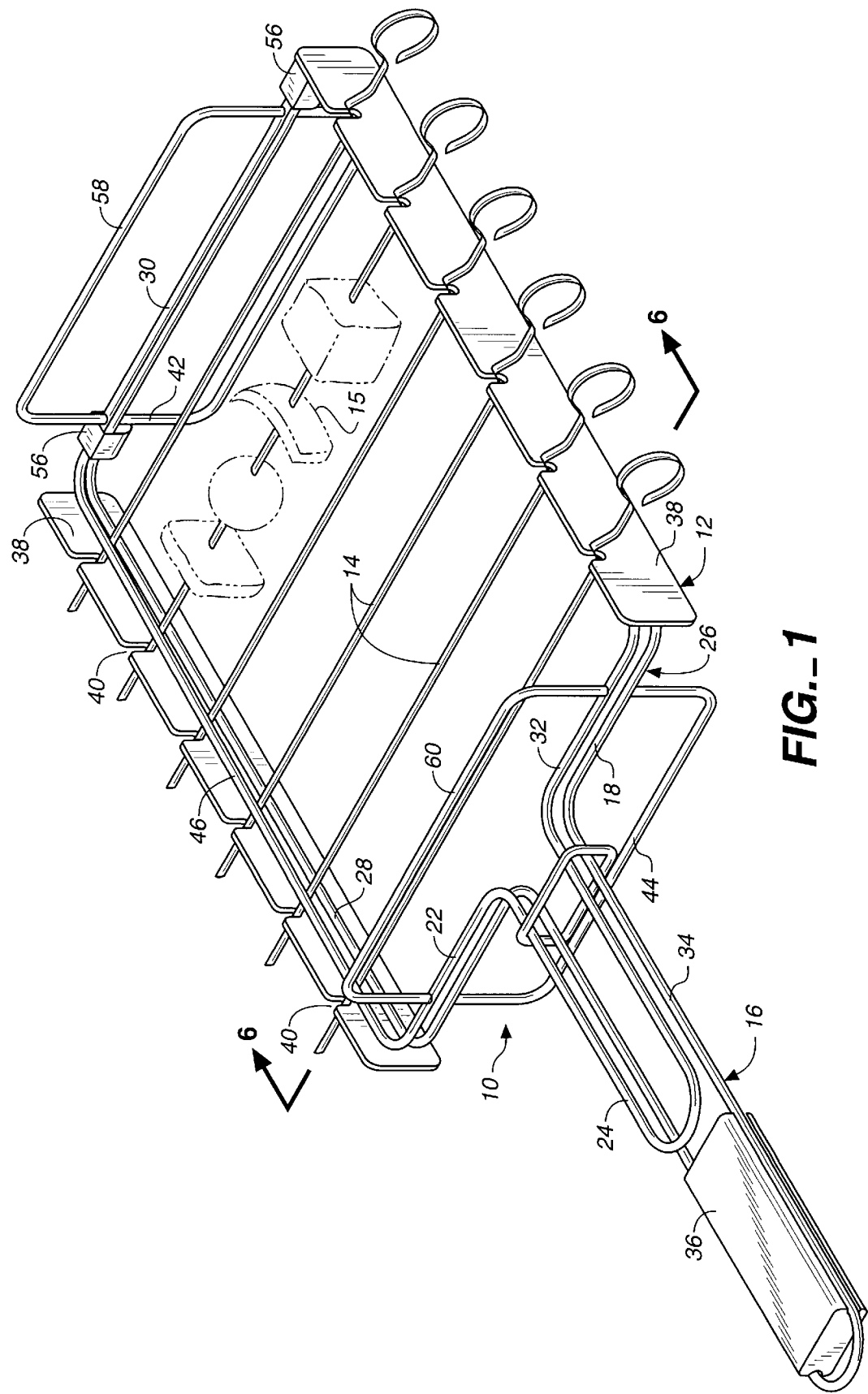
FIG._1

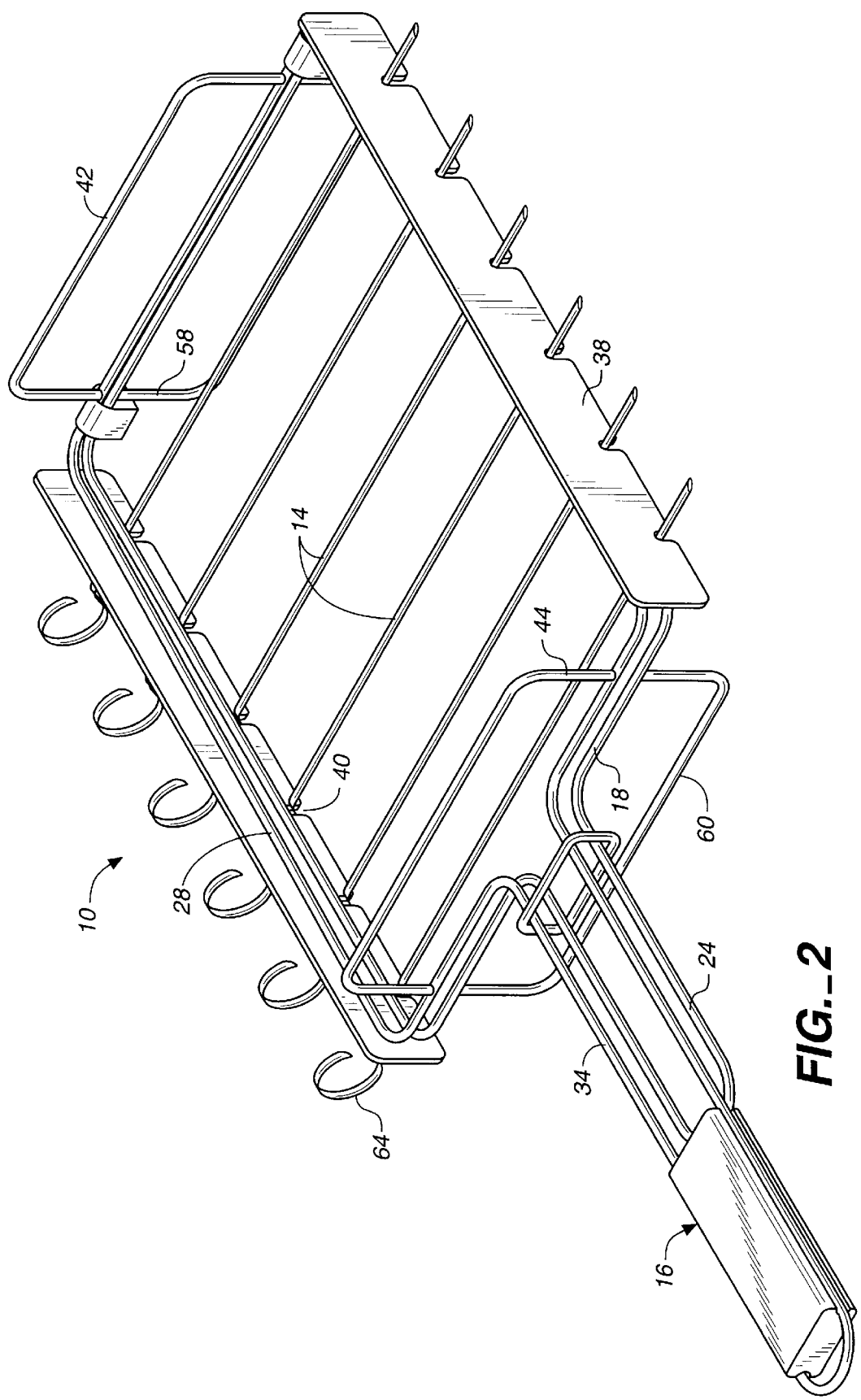
FIG._2

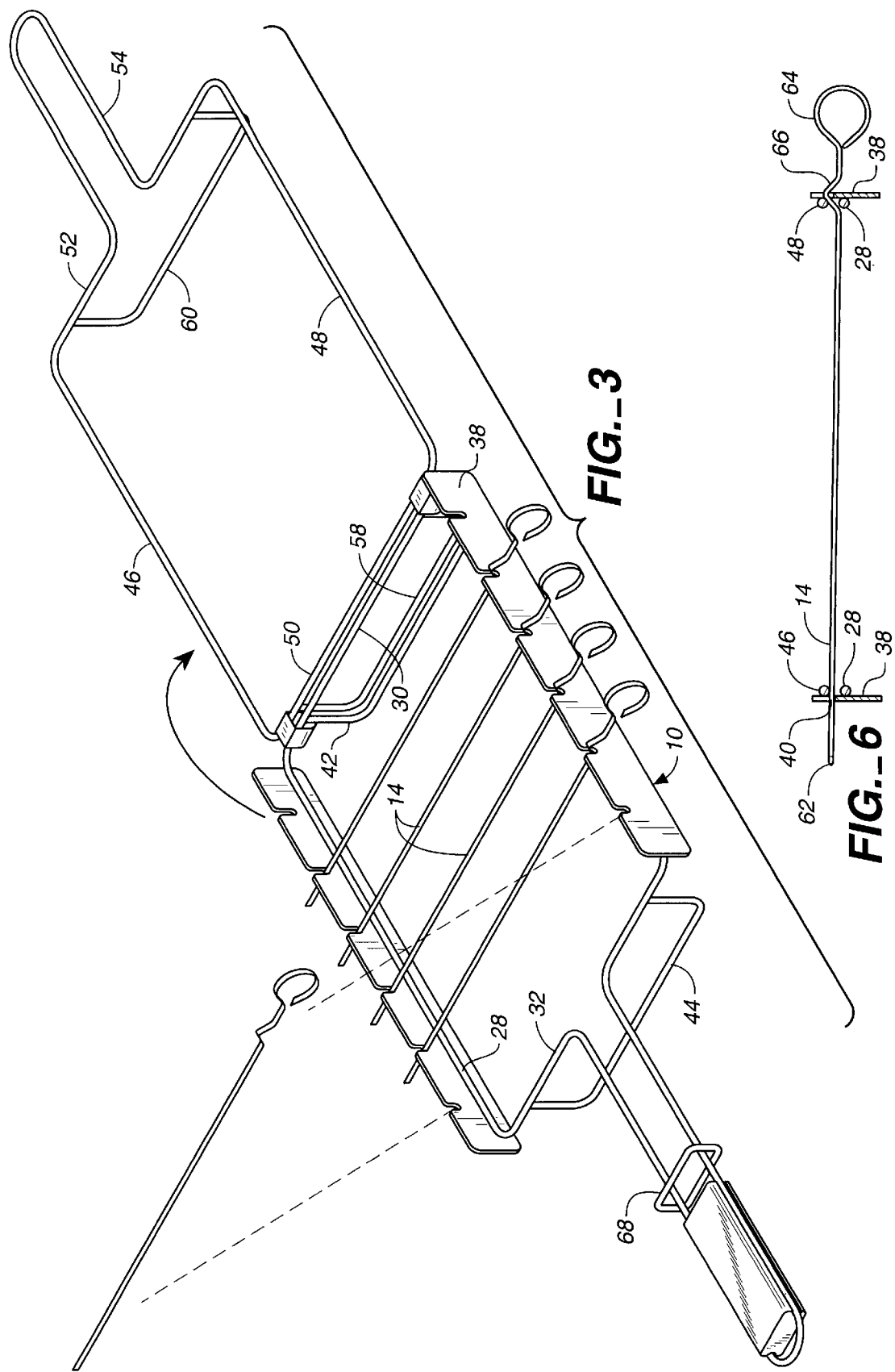

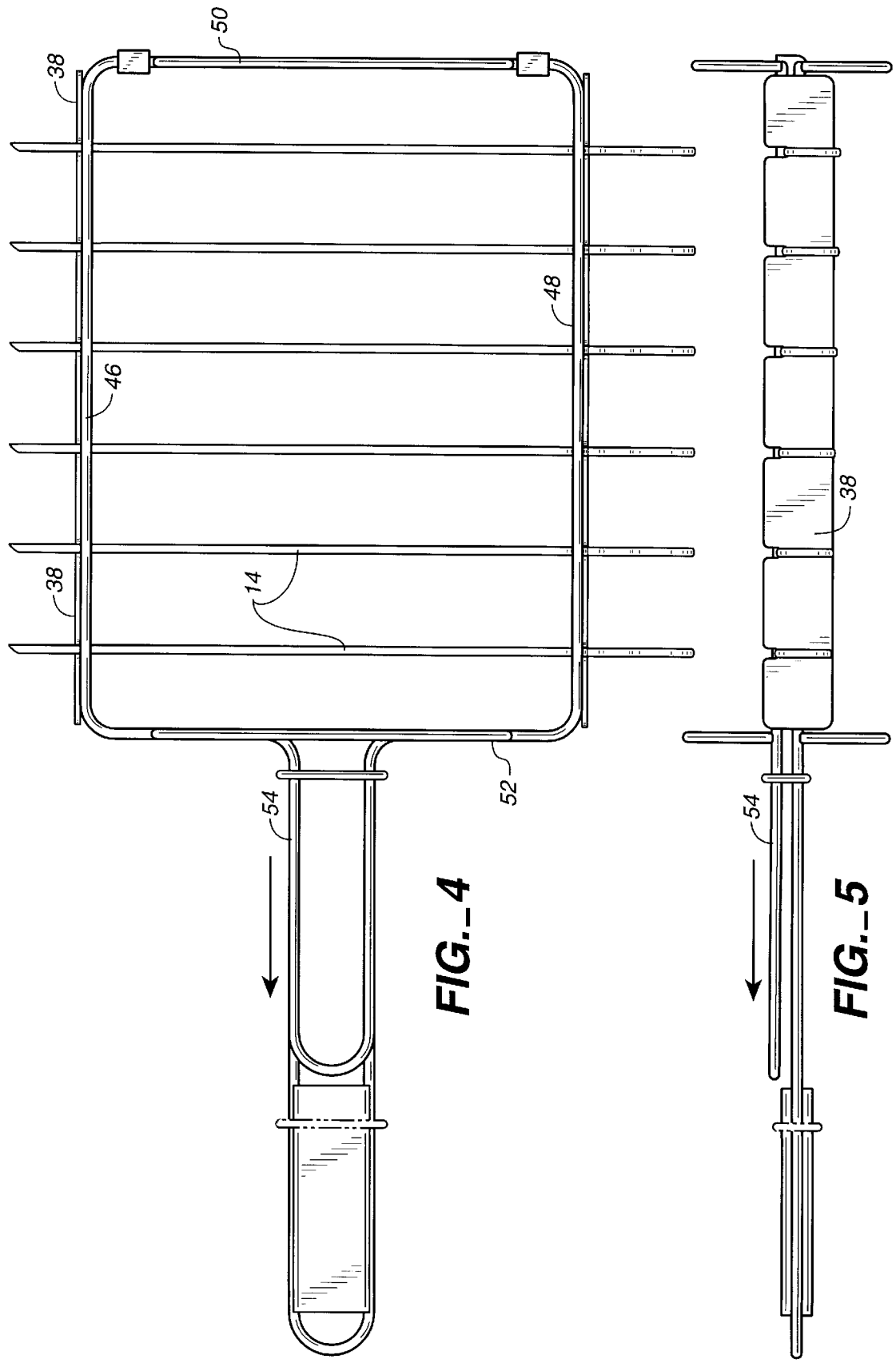

MULTIPLE KABOB HOLDER

This invention relates to cooking devices and more particularly to a device for barbecuing a plurality of skewered food items.

BACKGROUND OF THE INVENTION

A popular food item which is preferably prepared over an open fire or barbecue is commonly called a kabob. Such a dish generally comprises small pieces of marinated meat stuck on a skewer and often alternated with pieces of onion, tomato, mushrooms, etc. Heretofore, the skewers used for kabobs were relatively long and required some form of fixture to support or hold them as the kabob was roasted or broiled.

An object of the present invention is to provide a device for holding a plurality of relatively short kabob skewers and to maintain them at an optimum distance from heat producing barbecue or grille.

Another object of the invention is to provide a holding device for a plurality of kabobs that can be easily turned so as to provide uniform cooking or roasting of the kabob pieces.

Still another object of the invention is to provide a multiple kabob holder that is easy to load and unload and yet holds each kabob skewer firmly in place during the cooking process.

Yet another object of the invention is to provide a multiple kabob holder that is particularly well suited for ease and economy of manufacture.

SUMMARY OF THE INVENTION

In accordance with the principles of the invention a multiple kabob holder is provided which has a bottom frame section having a generally rectangular shape and a movable top frame section. The bottom frame section has a pair of side members, each with a series of spaced apart notches along their top edges. The notches on these side members are aligned so that a series of short skewers seated in them are equally spaced apart and extend transversely across the bottom frame section. When each skewer is loaded with pieces of meat and other food items to form a kabob, it is placed in a pair of aligned notches. Each skewer has a ring portion at one end to enable it to be easily grasped, and spaced from the ring portion is an indented portion of the skewer which serves to retain it within a notch and prevent longitudinal movement of the skewer. When the desired number of the notches are loaded with kabobs, the cover section, which is hinged at one end of the bottom section, is moved downward into its closed position. In this closed position the cover section has side portions that bear against the opposite ends of the skewers to hold them in place. The cover section has an extended handle portion which, in its closed position, coincides with a similar handle portion of the bottom section. A simple locking ring or bale is provided to hold the two handle portions together and thus hold the kabob skewers in place during the cooking process. Both the cover section and the bottom section have extended leg members at opposite ends so that the holder device, when loaded with kabobs, can be placed on the barbecue grille unattended while maintaining the kabobs at a proper distance from the heat source.

Other objects, advantages and features of the invention will become apparent from the following detailed description of a preferred embodiment thereof.

BRIEF DESCRIPTION OF THE DRAWING

FIG. 1 is a view in perspective of a multiple kabob holder embodying principles of the present invention.

FIG. 2 is a view in perspective showing the multiple kabob holder of FIG. 1 in the flipped upside down position.

FIG. 3 is a view in perspective showing the multiple kabob holder of FIG. 1 in the open position with one skewer removed.

FIG. 4 is a top plan view of the kabob holder of FIG. 1.

FIG. 5 is a side view in elevation of the kabob holder of FIG. 1.

FIG. 6 is a view in section taken along line 6—6 of FIG. 1.

DETAILED DESCRIPTION OF EMBODIMENT

With reference to the drawing, FIG. 1 shows a multiple kabob holder 10 embodying principles of the present invention as it appears in the upright position when supported on a barbecue grille or the like.

In general, the holder 10 comprises a frame-like bottom section 12 that supports a plurality (e.g. 6) skewers 14 that are evenly spaced apart and extend across the bottom section. Each skewer may extend through a series of meat and vegetable morsels 15 forming a kabob. The bottom section of the holder 10 has a handle portion 16 extending from one end 18. Connected to the opposite end 20 of the bottom section is a movable frame-like cover section 22 having its own handle portion 24.

In FIG. 2, the holder 10 is shown in the upside down or flipped position which facilitates cooking the kabob morsels 15 on their opposite side.

Describing now the invention in greater detail, the bottom section 12 is preferably formed from a fairly heavy wire material (e.g. 0.125 inches) which is bent in a continuous pattern to form a rigid rectangular frame 26 having side portions 28 and end portions 30 and 32. Extending from one end portion 32 is a narrow wire loop 34 whose outer end extends around a solid elongated piece 36 of wood or plastic to form the handle portion 16. Fixed to each of the wire side portions 28, as by welding, is a side member 38 made from a strip of sheet metal. Spaced apart along the top edge of each side member 38 are a series of notches 40 for retaining the skewers 14.

Fixed to the wire end portion 30 of the bottom section 12 is a U-shaped wire member 42 and a similar wire member 44 is attached to the other end portion 32. These wire members 42 and 44, which extend downwardly at right angles to the plane of the rectangular frame 26, provide supporting legs for the kabob holder when it rests upon a barbecue grill.

The cover section 22, as shown in FIGS. 3–5, is also preferably formed from a continuous piece of wire material in a generally rectangular shape have side portions 46 and 48 and end portions 50 and 52. Extending from end portion 52 in the same plane as side portions 46 and 48 is a narrow loop portion which forms the handle 24. This narrow loop portion aligns with but is somewhat shorter than the loop portion 34 of the bottom section 12 when the cover section 22 is closed on the bottom section 12. The end portion 50 is hingedly connected to the end portion 30 of the bottom section 12 by a pair of spaced apart clips 56. Fixed to and extending upwardly at right angles to the plane of the side portions 46 and 48 are a pair of U-shaped wire members 58 and 60 similar to members 42 and 44 on the bottom section 12.

These members 58 and 60 serve as supporting legs for the kabob holder 10 when it is flipped or turned upside-down on a grill during the cooking process, as shown in FIG. 2.

As shown in the drawing, particularly FIG. 6, each skewer 14 is made of relatively rigid wire material with a sharpened tip 62 at one end and a loop 64 at the other end. Each skewer rests within a pair of the aligned notches 40 in the opposite spaced apart side members 38 of the bottom section 12. Spaced from loop 64 on each skewer is an indented V-shaped portion 66 which serves to hold the skewer within its notch in a side member 38 to prevent any inadvertent movement. When the cover section 22 is closed its wire side portions 46 and 48 bear down on the skewers 14 and hold them firmly within the notches of the side members 38 of the bottom section.

In using the kabob holder 10, the individual skewers are first loaded with desired combinations of meat and vegetable morsels. With the bottom section 12 resting on a flat surface and the cover section 22 open, as shown in FIG. 3, the loaded skewers are placed in the aligned notches 40 of the side members 38. Now, the cover section 12 can be rotated down into its closed position, as shown in FIG. 1. When the cover section is closed, its wire side portions 46 and 48 bear against the skewers 14 near their opposite ends to hold them firmly in place. The handle portion 24 of the cover section 22 is positioned adjacent to the handle portion 34 of the bottom section and a movable bale or ring 68 is moved forwardly to hold the two handle portions 24 and 34 together. The kabob holder 10 can now be placed on a barbecue grill (not shown) where it is initially supported by the leg members 42 and 44 which hold the kabobs at a proper distance from the barbecue heat. At the proper time the kabob holder 10 can be turned over, as shown in FIG. 2, so that the kabobs can be cooked on their other side.

From the foregoing, it is seen that the present invention provides an efficient means for cooking a plurality of individual kabobs on a barbecue or the like and a device that is light, yet durable and easy to use.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A device for holding a plurality of skewered kabobs during a cooking process comprising:

a bottom section having side members, end portions and a handle member;

a plurality of spaced apart skewers extending between said side members;

a cover section which is movable from an open to a closed position and including side portions for retaining said skewers in place on said bottom section when in the closed position; and supporting leg means for maintaining said skewers at a distance from a heated cooking surface whenever said device is resting thereon in either a normal or an upside down position.

2. The device as described in claim 1 wherein said side members of said bottom section have spaced apart notches for receiving said skewers, and said cover section has wire like side portions which bear against said skewers to retain them in said notches when the cover section is in the closed position.

3. The device as described in claim 1 including handle portions on said bottom section and said cover section which are adjacent each other when said cover section is closed, and means for holding said handle portions together when said device is being used.

4. The device as described in claim 2 wherein each said skewer has a sharpened tip at one end and a loop portion at its opposite end, and an indented portion near said loop portion which is adapted to fit within a said notch and thereby prevent longitudinal movement of a skewer when said cover section is closed.

5. The device as described in claim 1 wherein said supporting leg means comprise a first pair of U-shaped wire portions at the opposite ends of said bottom section and a second pair of U-shaped wire portions at the opposite ends of said cover sections.

* * * * *